United States Patent
Sato

(10) Patent No.: US 6,192,425 B1
(45) Date of Patent: Feb. 20, 2001

(54) PERSONAL COMPUTER INTERRUPT LINE SHARING CIRCUIT WITH ACTIVE INTERRUPT LINE MONITORING, AND METHOD FOR SHARING A COMMON INTERRUPT LINE BY ACTIVE MONITORING

(75) Inventor: Shinobu Sato, Tokyo (JP)

(73) Assignee: NEC Corporation, Tokyo (JP)

(*) Notice: Under 35 U.S.C. 154(b), the term of this patent shall be extended for 0 days.

(21) Appl. No.: 08/839,626

(22) Filed: Apr. 15, 1997

(30) Foreign Application Priority Data

Apr. 15, 1996 (JP) .................................................. 8 092654

(51) Int. Cl.[7] ............................. G06F 13/14; G06F 13/20
(52) U.S. Cl. .............................. 710/48; 710/15; 710/19; 710/260; 710/267
(58) Field of Search ..................................... 395/839, 868, 395/835; 710/260, 267, 15, 19, 48

(56) References Cited

U.S. PATENT DOCUMENTS

| | | | |
|---|---|---|---|
| 4,626,987 * | 12/1986 | Renninger | 364/200 |
| 4,641,266 * | 2/1987 | Walsh | 364/200 |
| 4,760,516 * | 7/1988 | Zwick | 364/200 |
| 4,768,149 * | 8/1988 | Konopik et al. | 364/200 |
| 5,187,781 | 2/1993 | Heath | 395/325 |
| 5,313,621 * | 5/1994 | Chan | 395/550 |
| 5,506,997 * | 4/1996 | Maguire et al. | 395/800 |
| 5,535,420 * | 7/1996 | Kardach et al. | 395/868 |
| 5,590,376 * | 12/1996 | Kou | 395/839 |
| 5,802,398 * | 9/1998 | Liu et al. | 710/62 |

FOREIGN PATENT DOCUMENTS 3-191410    8/1991   (JP) .

* cited by examiner

*Primary Examiner*—Thomas C. Lee
*Assistant Examiner*—Rehana Perveen
(74) *Attorney, Agent, or Firm*—Ostrolenk, Faber, Gerb & Soffen, LLP

(57) ABSTRACT

In an interrupt line sharing circuit for a personal computer system, which has a plurality of instruments and one common interrupt line provided in common to the plurality of instruments, a personal computer executes a predetermined I/O access at each time the personal computer has completed an interrupt processing. Each of the plurality of instruments comprises an I/O monitoring circuit for monitoring whether or not the predetermined I/O access has been performed, and an interrupt line monitoring circuit monitoring the common interrupt line, for judging that an interrupt processing has been started if an interrupt request has been sent onto the common interrupt line from one of the instruments. The interrupt line monitoring circuit also judges that the interrupt processing has been completed when the I/O monitoring circuit detects the predetermined I/O access. An interrupt line control circuit discriminates a busy/not-busy condition of the common interrupt line on the basis of the start and the completion of the interrupt processing judged by the interrupt line monitoring circuit. The condition of the common interrupt line ensures that the interrupt request generated in the plurality of instruments is sent the interrupt line after the completion of the interrupt processing.

21 Claims, 4 Drawing Sheets

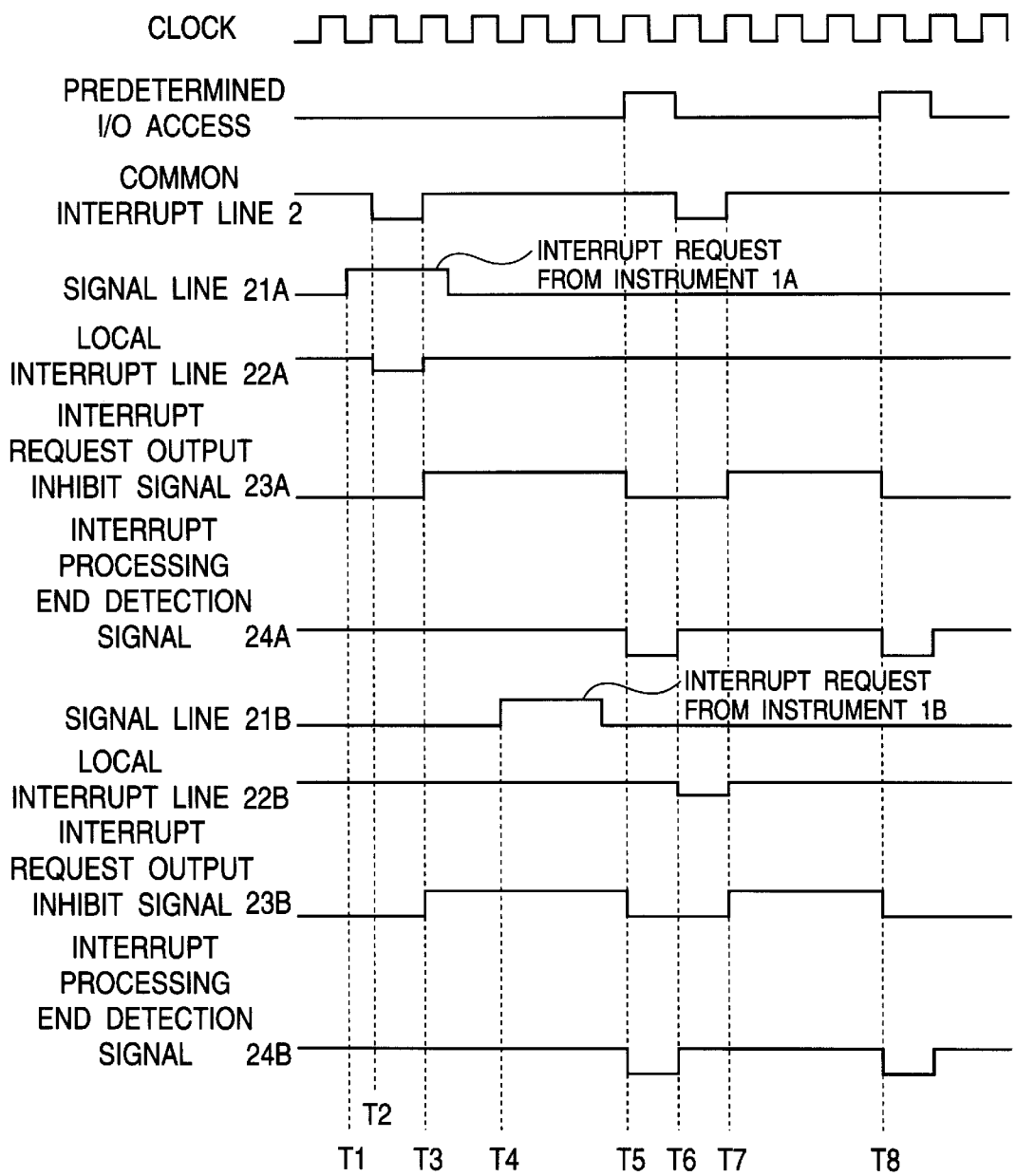

PERSONAL COMPUTER INTERRUPT LINE SHARING CIRCUIT WITH ACTIVE INTERRUPT LINE MONITORING, AND METHOD FOR SHARING A COMMON INTERRUPT LINE BY ACTIVE MONITORING

BACKGROUND OF THE INVENTION

1. Field of the Invention

The present invention relates to a personal computer system, and more specifically to an interrupt line sharing circuit for a personal computer system, for enabling that a common interrupt line is shared by a plurality of instruments, and a method for sharing the common interrupt line.

2. Description of Related Art

In the prior art, this type of interrupt line sharing circuit has been used in a personal computer system having an edged triggered type interrupt line, for the purpose of enabling that one interrupt line is common to a plurality of instruments and shared by the plurality of instruments, as disclosed in Japanese Patent Application Laid-open Publication No. JP-A-3-191410, which corresponds to U.S. Pat. 5,187,781, the disclosure of which is incorporated by reference in its entirety into this application.

Referring to FIG. 1, there is shown a circuit diagram of the prior art interrupt line sharing circuit disclosed by JP-A-3-191410 and hence U.S. Pat. 5,187,781. In the shown prior art interrupt line sharing circuit, an instrument 101A includes a resistor 200A, a high transistor 213A, a diode 215A and a low transistor 211A connected, in the named order and in their forward direction, in series between a power supply line 107A and a ground line 109A. A connection node between the diode 215A and the low transistor 211A constitutes an output, which is branched to an interrupt line 217A connected through a diode 219A in its forward direction to a common interrupt line 105.

Similarly to the instrument 101A, an instrument 101B includes a resistor 200B, a high transistor 213B, a diode 215B and a low transistor 211B connected, in the named order and in their forward direction, in series between a power supply line 107B and a ground line 109B. A connection node between the diode 215B and the low transistor 211B constitutes an output, which is branched to an interrupt line 217B connected through a diode 219B in its forward direction to the common interrupt line 105.

The common interrupt line 105 is pulled down through a resistor 104, and also connected through a Schmitt trigger circuit 221 to an interrupt request line 102 of a personal computer.

Now, operation of this prior art interrupt line sharing circuit will be described.

In an ordinary condition, the common interrupt line 105 is pulled down to a low level through the resistor 104, so that the interrupt request line 102 is also at the low level. In the instruments 101A and 101B, furthermore, the low transistors 211A and 211B are on and the high transistors 213A and 213B are off, so that the interrupt lines 217A and 217B are also at the low level.

When the instrument 101A generates an interrupt request, the instrument 101A turns off the low transistor 211A and turns on the high transistor 213A, so that the interrupt line 217A is brought to the high level. As a result, the common interrupt line 105 is brought to the high level through the diode 219A, so that the interrupt request line 102 is correspondingly brought to the high level by action of the Schmidt trigger circuit 211. At this time, if the instrument 101B does not generate an interrupt request, the low transistor 211B is on and the high transistor 213B is off. However, the power supply line 107A does not short-circuit with the ground line 109B because of existence of the diode 219B.

Furthermore, if the instrument 101B generates an interrupt request, both the interrupt lines 217A and 217B are brought to the high level. Although the interrupt line 217A is brought to the low level as the result of completion of an interrupt processing for the instrument 101A, since the interrupt line 217B is still at the high level, the interrupt request line 102 is maintained at the high level, so that the personal computer can acknowledge the interrupt request from the instrument 101B.

However, in most of conventional personal computer systems which cannot share the interrupt line, the interrupt request signal is defined as an edge trigger type. Therefore, the above mentioned prior art interrupt line sharing circuit which supplies the interrupt request signal of a level trigger type, cannot be applied to the most conventional personal computer systems.

SUMMARY OF THE INVENTION

Accordingly, it is an object of the present invention to provide an interrupt line sharing circuit for a personal computer system, and a method for sharing the interrupt line, which have overcome the above mentioned defect of the conventional one.

Another object of the present invention is to provide an interrupt line sharing circuit for a personal computer system, and a method for sharing the interrupt line, both of which enable that one interrupt line is shared by a plurality of instruments, and which can be applied in a personal computer system in which an interrupt request signal is defined as an edge trigger type.

The above and other objects of the present invention are achieved in accordance with the present invention by an interrupt line sharing circuit for a personal computer system, which has a personal computer, a plurality of instruments and one common interrupt line provided in common to the plurality of instruments, wherein the personal computer is configured to perform a predetermined input/output access when the personal computer has completed an interrupt processing, and wherein the interrupt line sharing circuit comprises:

an input/output monitoring means for monitoring whether or not the predetermined input/output access has been performed;

an interrupt line monitoring means monitoring the common interrupt line, for judging that an interrupt processing is started if an interrupt request is sent onto the common interrupt line from any one of the plurality of instruments, the interrupt line monitoring means being connected to the input/output monitoring means, for judging that the interrupt processing has been completed when the input/output monitoring means detects the predetermined input/output access; and an interrupt line control means coupled to the interrupt line monitoring means, for discriminating a busy/not-busy condition of the common interrupt line on the basis of the start and the completion of the interrupt processing judged by the interrupt line monitoring means, and for sending the interrupt request generated in the plurality of instruments, to the common interrupt line after the completion of the interrupt processing.

According to another aspect of the present invention, there is provided a method for sharing one common interrupt line provided in common to a plurality of instruments in a personal computer system, comprising the steps of:

causing a personal computer to perform a predetermined input/output access when the personal computer has completed an interrupt processing;

judging that an interrupt processing is started if an interrupt request is sent onto the common interrupt line from any one of the plurality of instruments, and also judging that the interrupt processing has been completed when the predetermined input/output access is detected; and discriminating a busy/not-busy condition of the common interrupt line on the basis of the judgement of the start and the completion of the interrupt processing, for sending the interrupt request generated in the plurality of instruments, to the common interrupt line after the completion of the interrupt processing.

As seen from the above, in the present invention, when an interrupt request is sent onto the common interrupt line from any one of the plurality of instruments, namely, an interrupt request signal of the edge trigger type is detected on the common interrupt line, it is judged that the interrupt processing has been started. Completion of this interrupt processing is judged by detecting the predetermined input/output access performed by the personal computer. Thus, if the start and the completion of the interrupt processing can be known, it is possible to know the busy/not-busy condition of the common interrupt line. Therefore, it is possible to send the interrupt request generated in the plurality of instruments, to the common interrupt line, when the common interrupt line is not busy. Accordingly, if it is deemed that the common interrupt line is not busy, the interrupt request can be immediately notified to the personal computer, and on the other hand, if it is deemed that the common interrupt line is busy, the interrupt request can be notified to the personal computer after the busy condition of the common interrupt line is solved.

The above and other objects, features and advantages of the present invention will be apparent from the following description of preferred embodiments of the invention with reference to the accompanying drawings.

BRIEF DESCRIPTION OF THE DRAWINGS

FIG. 6 is a timing chart illustrating an operation of the interrupt line sharing circuit shown in FIG. 2.

DESCRIPTION OF THE PREFERRED EMBODIMENTS

Figure 1:
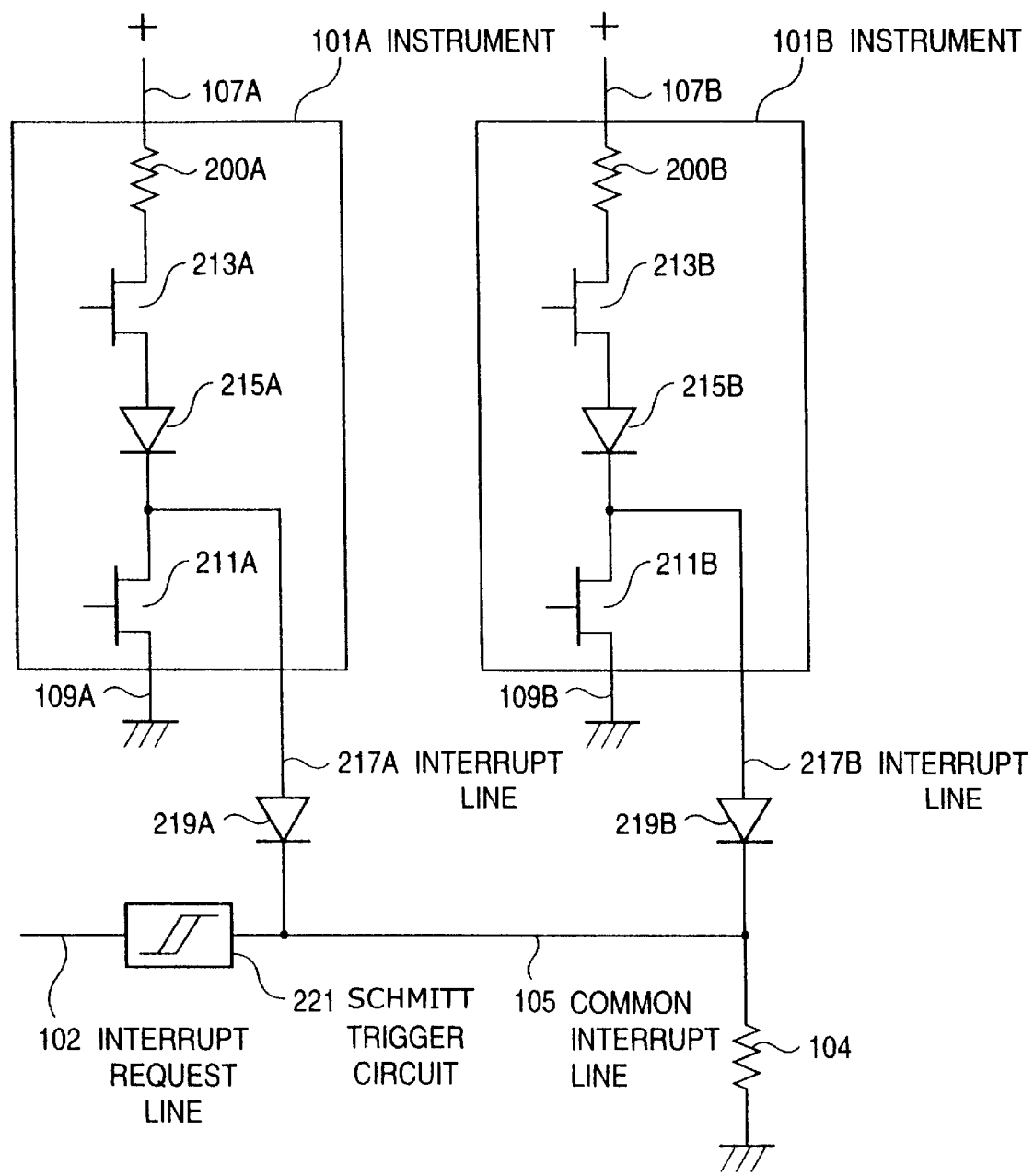
FIG. 1 is a circuit diagram of the prior art interrupt line sharing circuit.
Figure 2:
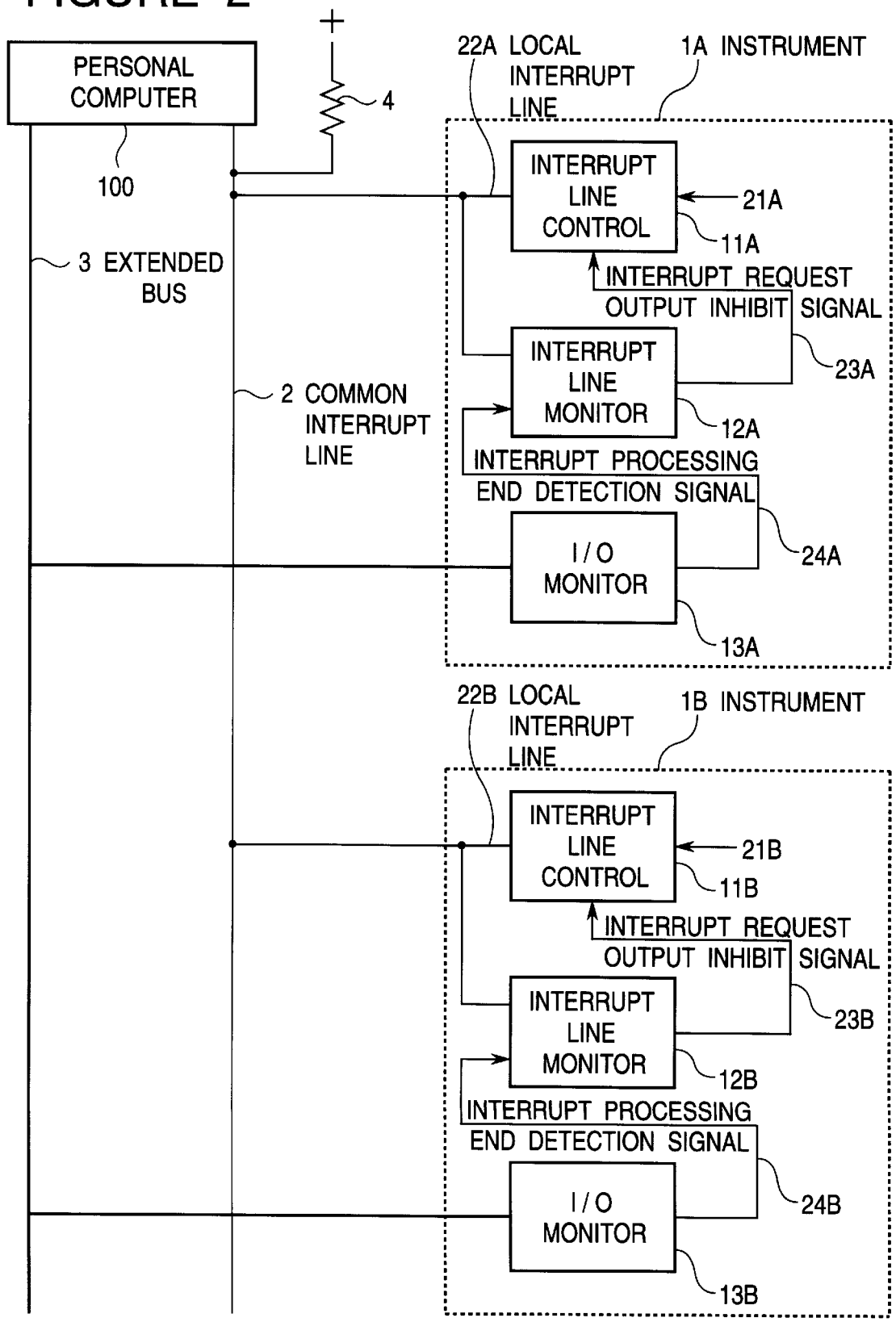
FIG. 2 is a block diagram of one embodiment of the interrupt line sharing circuit in accordance with the present invention.

Referring to FIG. 2, there is shown a block diagram of one embodiment of the interrupt line sharing circuit in accordance with the present invention.

As shown in FIG. 2, an instrument 1A comprises an interrupt line control circuit 11A, an interrupt line monitor circuit 12A and an I/O (input/output) monitor circuit 13A, which are connected as shown. An instrument 1B comprises an interrupt line control circuit 11B, an interrupt line monitor circuit 12B and an I/O (input/output) monitor circuit 13B, which are connected as shown. The interrupt line control circuit 11A, the interrupt line monitor circuit 12A and the I/O monitor circuit 13A, correspond to the interrupt line control circuit 11B, the interrupt line monitor circuit 12B and the I/O (input/output) monitor circuit 13B, respectively. Accordingly, the instrument 1A and the instrument 1B have the same construction.

The instruments 1A and 1B are connected through local interrupt lines 22A and 22B, respectively, to a common interrupt line 2 of a personal computer 100. Each of these local interrupt lines 22A and 22B is in a high impedance condition when a corresponding instrument does not generate an interrupt request. However, in an ordinary personal computer which defines an interrupt request signal as an edge trigger type, since the common interrupt line 2 is pulled up through a resistor 4, the local interrupt lines 22A and 22B are at a high level when none of the instruments generates an interrupt request. In addition, the personal computer 100 is configured to perform a predetermined I/O access (which is called an "interrupt processing end access" hereinafter) without exception, at each time the personal computer 100 has completed one interrupt processing based on an interrupt request from an associated instrument.

The personal computer 100 has an extended bus 3 including an address bus, a data bus and a control bus (all not shown) for supplying various control signals containing for example an I/O write signal and a clock. Each of the I/O monitor circuits 13A and 13B is coupled to the extended bus 3 for monitoring whether or not the interrupt processing end access has been performed. When the interrupt processing end access is detected, the I/O monitor circuits 13A and 13B notify that fact to the interrupt line monitor circuits 12A and 12B, respectively, by outputting an active interrupt processing end detection signal through signal lines 24A and 24B, respectively. Here, it is assumed that when the interrupt processing end access is detected, the I/0 monitor circuits 13A and 13B bring the interrupt processing end detection signal supplied to the corresponding signal lines 24A and 24B to a low level, respectively.

Each of the interrupt line monitor circuits 12A and 12B is connected to monitor a signal condition on the corresponding local interrupt line 22A or 22B and to receive and monitor the interrupt processing end detection signal on the corresponding signal line 24A or 24B from the corresponding I/O monitor circuit 13A or 13B, for the purpose of discriminating the current busy/not-busy condition of the common interrupt line 2. The result of the discrimination is notified by outputting an interrupt request output inhibit signal through a corresponding signal line 23A or 23B to the corresponding interrupt line control circuit 11A or 11B. Specifically, if an interrupt request is sent onto the common interrupt line 2 from any one of the instruments, it is judged to be a start of an interrupt processing, and the start of the interrupt processing is notified by activating the interrupt request output inhibit signal 23A or 23B to for example a high level. If the predetermined I/O access is detected by the I/O monitor circuit 13A, 13B so that the interrupt processing end detection signal 24A, 24B is activated to the low level, it is judged to be a completion of the interrupt processing, and the completion of the interrupt processing is notified by deactivating the interrupt request output inhibit signal 23A or 23B, to for example, a low level.

Each of the interrupt line control circuits 11A and 11B receives an interrupt request of the corresponding instrument 1A or 1B through a corresponding signal line 21A or 21B, and drives the associated local interrupt line 22A or 22B to a low level during a period corresponding to one clock, if it is deemed that the common interrupt line 2 is not used by any one of the instruments. If it is deemed that the common interrupt line 2 is used by any one of the instruments, the interrupt line control circuit 11A or 11B waits for completion of the interrupt processing, and drives the associated local interrupt line 22A or 22B to the low level during the period corresponding to one clock, after completion of the interrupt processing.

Next, an internal construction of the interrupt line control circuits 11A and 11B, the interrupt line monitor circuits 12A and 12B, and the I/O monitor circuits 13A and 13B will be described The interrupt line control circuits 11A and 11B can be constructed of for example a combination of flipflops and logic gates. Since the interrupt line control circuits 11A and 11B have the same construction, only an internal construction of the interrupt line control circuit 11A will be described with reference to FIG. 3, which shows a logic circuit diagram of the interrupt line control circuit 11A incorporated in the interrupt line sharing circuit shown in FIG. 2. Explanation of the interrupt line control circuit 11B will be omitted.

Figure 3:
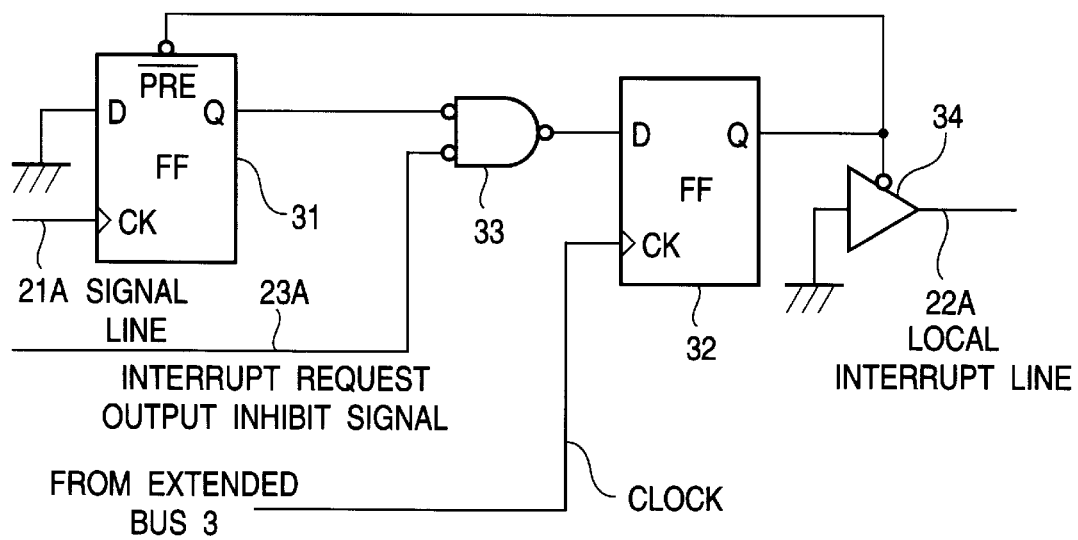
FIG. 3 is a logic circuit diagram of the interrupt line control circuit incorporated in the interrupt line sharing circuit shown in FIG. 2.

The interrupt line control circuit 11A includes a D-type flipflop 31, another D-type flipflop 32, a negative-logic AND gate (positive-logic OR gate) 33 and a tristate buffer 34, which are all connected as shown in FIG. 3.

The D-type flipflop 31 has a data input terminal D connected to ground, and a clock terminal CK connected to the signal line 21A. Thus, when the interrupt request signal is supplied through the signal line 21A, this D-type flipflop 31 outputs a low level signal from its non-inverting output terminal Q in synchronism with a rising of the interrupt request signal supplied through the signal line 21A. This D-type flipflop 31 has an inverted preset input $\overline{PRE}$ connected to a non-inverting output terminal Q of the second D-type flipflop 32, so that when the non-inverting output terminal Q of the second D-type flipflop 32 becomes a low level, the D-type flipflop 31 is preset to output a high level signal from its non-inverting output terminal Q.

The negative-logic AND gate 33 has a first input connected to the non-inverting output terminal Q of the D-type flipflop 31, and a second input connected to receive the interrupt request output inhibit signal 23A from the corresponding interrupt line monitor circuit 12A. Therefore, only when the output Q of the D-type flipflop 31 is at the low level and the interrupt request output inhibit signal 23A is at the low level signal (inactive), the negative-logic AND gate 33 output a low level signal as an active intermediate interrupt request signal.

The D-type flipflop 32 has a data input terminal D connected to the output of the negative-logic AND gate 33 to receive the intermediate interrupt request signal, and a clock terminal CK connected to receive a clock supplied through the extended bus 3. Therefore, this D-type flipflop 32 latches or samples the output signal of the negative-logic AND gate 33 in response to each clock supplied through the extended bus 3, and outputs a sampled result from its non-inverting output terminal Q. The non-inverting output terminal Q of the D-type flipflop 32 is connected to an inverted control input of the tristate buffer 34 and the inverted preset terminal $\overline{PRE}$ of the D-type flipflop 31.

The tristate buffer 34 has an input connected to ground. Therefore, when the output Q of the D-type flipflop 32 is at the high level, the output of the tristate buffer 34 connected to the local interrupt line 22A is brought into the high impedance condition, and only when the output Q of the D-type flipflop 32 is at the low level, the output of the tristate buffer 34 and hence the local interrupt line 22A are brought to the low level.

Figure 4:
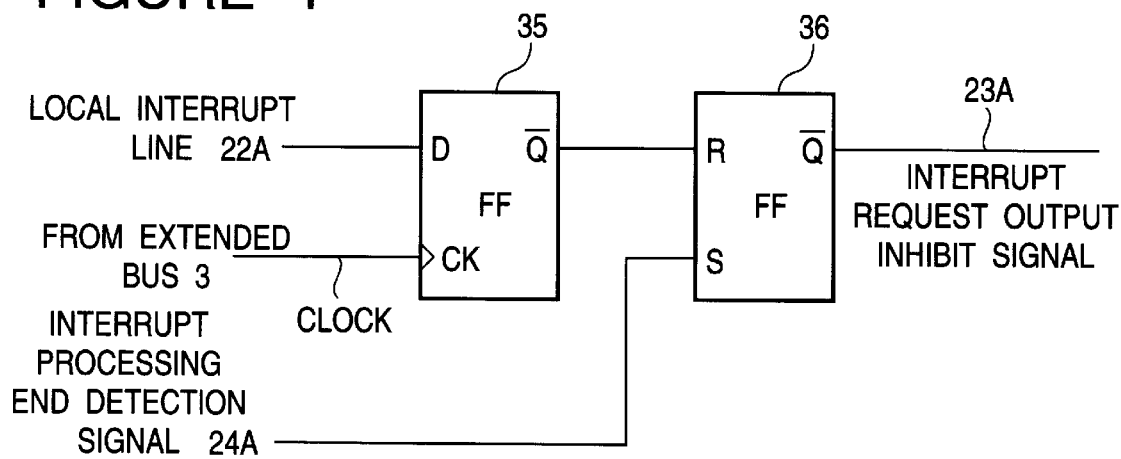
FIG. 4 is a logic circuit diagram of the interrupt line monitor circuit incorporated in the interrupt line sharing circuit shown in FIG. 2.

The interrupt monitor circuits 12A and 12B can be constructed of, for example, a combination of flipflops. Since the interrupt monitor circuits 12A and 12B have the same construction, only an internal construction of the interrupt monitor circuit 12A will be described with reference to FIG. 4, which shows a logic circuit diagram of the interrupt monitor circuit 12A incorporated in the interrupt line sharing circuit shown in FIG. 2. Explanation of the interrupt monitor circuit 12B will be omitted.

The interrupt monitor circuit 12A includes a D-type flipflop 35 and a SR (set/reset) flipflop 36 which are connected as shown.

The D-type flipflop 35 has a data input terminal D connected to the local interrupt line 22A, and a clock terminal CK connected to receive the clock supplied through the extended bus 3. Therefore, this D-type flipflop 35 latches or samples the level of the local interrupt line 22A, in response to each clock supplied through the extended bus 3, and outputs an inverted value of a sampled level from its inverting output terminal $\overline{Q}$.

The SR flipflop 36 has a set input S connected to receive the interrupt processing end detection signal 24A and a reset input R connected to the output terminal $\overline{Q}$ of the D-type flipflop 35. A non-inverting output terminal 6 of the SR flipflop 36 outputs the interrupt request output inhibit signal 23A.

Figure 5:
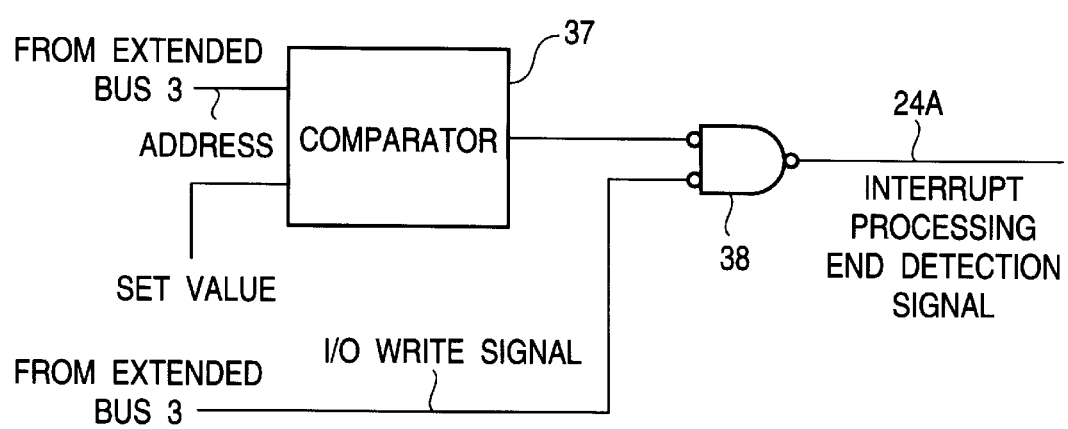
FIG. 5 is a logic circuit diagram of the I/O monitor circuit incorporated in the interrupt line sharing circuit shown in FIG. 2.

The I/O monitor circuits 13A and 13B can be constructed of, for example, a combination of a comparator and a logic gate. Since the I/O monitor circuits 13A and 13B have the same construction, only an internal construction of the I/O monitor circuit 13A will be described with reference to FIG. 5, which shows a logic circuit diagram of the I/O monitor circuit 13A incorporated in the interrupt line sharing circuit shown in FIG. 2. Explanation of the I/O monitor circuit 13B will be omitted.

The I/O monitor circuit 13A includes a comparator 37 and a negative-logic AND gate (positive-logic OR gate) 38 which are connected as shown. The comparator 37 has one input connected to receive an address supplied through the extended bus 3, and the other input connected to receive a set value, which is selected from for example I/O addresses which are not used in the personal computer. When the address and the set value are consistent with each other, the comparator outputs a consistency signal of a low level.

The negative-logic AND gate 38 has a first input connected to an output of the comparator 37 and a second input connected to an I/O write signal supplied through the extended bus 3. The negative-logic AND gate 38 outputs a low level signal only when both the first and second inputs of the negative-logic AND gate 38 are at the low level. An output of the negative-logic AND gate 38 outputs the interrupt processing end detection signal 24A.

Now, an operation of the interrupt line sharing circuit shown in FIG. 2 will be described with reference to FIG. 6, which is a timing chart illustrating an operation of the interrupt line sharing circuit.

As mentioned above, when none of the instruments 1A and 1B generates an interrupt request, both the local interrupt lines 22A and 22B are in the high impedance condition, but are actually maintained at the high level since the common interrupt line 2 is pulled up through the resistor 4. In addition, since the local interrupt lines 22A and 22B are at the high level and since the interrupt processing end detection signals 24A and 24B are at the high level, the interrupt request output inhibit signal of the low level (inactive) is outputted from each of the signal lines 23A and 23B.

In this condition, if the instrument 1A generates the interrupt request signal of the high level on the signal line 21A at a timing T1, the interrupt line control circuit 11A drives the local interrupt line 22A to the low level during a period from a timing T2 to a timing T3, which corresponds to one period of the clock. As a result, a rising edge appears on the common interrupt line 2 at the timing T3, so that the interrupt request is notified to the personal computer 100. Namely, the interrupt signal of the edge trigger type is sent to the personal computer.

Each of the interrupt line monitor circuits 12A and 12B samples the status of the common interrupt line 2, and judges or considers that an interrupt processing based on the interrupt request generated from any one of the instruments has been started, when the interrupt line monitor circuit detects the rising edge appearing on the common interrupt line 2. As a result, the interrupt line monitor circuits 12A and 12B bring the corresponding signal lines 23A and 23B to the high level. Namely, each of the interrupt line monitor circuits 12A and 12B outputs the active interrupt request output inhibit signal 23A, 23B of the high level. This high level condition of the interrupt request output inhibit signals 23A and 23B continues until a timing T5 where the interrupt processing end access is performed through the extended bus 3 by the personal computer 100 as the result of the completion of the interrupt processing. Namely, the high level condition of the interrupt request output inhibit signals 23A and 23B means that the interrupt processing continues to be performed in the personal computer 100, this means, that since the interrupt processing has not yet been completed, a new interrupt request cannot be acknowledged.

In this condition, if the instrument 1B generates the interrupt request signal of the high level on the signal line 21B at a timing T4 during an execution period (T3~T5) of the interrupt processing for the instrument 1A, the interrupt line control circuit 11B maintains the local interrupt line 22B in the high impedance condition during a period that the interrupt request output inhibit signal 23B is at the high level, namely, during the execution period of the interrupt processing. Even though, the D-type flipflop 31 in the instrument 1B latches the interrupt request signal, the output of the D-type flipflop 31 in the instrument 1B is blocked by the negative-logic AND gate 33 in the instrument 1B.

At the timing T5, if the interrupt processing for the instrument 1A is completed by the personal computer 100, the interrupt processing end access is performed through the extended bus 3 by the personal computer 100, by outputting the predetermined address (which is selected from the I/O addresses not used in the personal computer as mentioned hereinbefore and which is equal to the set value) and by activating the I/O write signal into the low level. This interrupt processing end access is illustrated by a high level pulse shown in a "PREDETERMINED I/O ACCESS" in FIG. 6.

The predetermined address outputted from the personal computer is compared with the set value by the comparator 37. Since the predetermined address is equal to the set value, the comparator 37 outputs the consistency signal of the low level to one input of the negative-logic AND gate 38. Since the negative-logic AND gate 38 receives the active I/O write signal of the low level at its other input, the negative-logic AND gate 38 outputs the active interrupt processing end detection signal of the low level through the associated signal line 24A or 24B. Thus, the interrupt processing end access performed through the extended bus 3 by the personal computer 100 is detected by each of the I/O monitor circuits 13A and 13B, so that the I/O monitor circuits 13A and 13B bring the interrupt processing end detection signals 24A and 24B to the low level during a period corresponding to one clock. Thus, the completion of the interrupt processing is notified to the interrupt line monitor circuits 12A and 12B, respectively, so that each of the interrupt line monitor circuits 12A and 12B judges or considers that the interrupt processing has been completed, and brings the interrupt request output inhibit signals 23A and 23B to the low level (inactive).

If the interrupt request output inhibit signal 23B is brought to the low level, since the negative-logic AND gate 33 is opened, on the basis of the interrupt request generated in the instrument 1B at the timing T4 and held in the D-type flipflop 31 in the instrument 1B, the interrupt line control circuit 11B drives the local interrupt line 22B to the low level during a period from a timing T6 to a timing T7. As a result, a rising edge appears on the common interrupt line 2 at the timing T7, so that the interrupt request is notified to the personal computer 100.

During a period from the timing T7 to a timing T8, since the interrupt processing continues to be performed, each of the interrupt request output inhibit signal 23A and 23B is maintained at the high level.

At the timing T8, if the interrupt processing for the instrument 1B is completed by the personal computer 100, the interrupt processing end access is performed through the extended bus 3 by the personal computer 100, and this is detected by each of the I/O monitor circuits 13A and 13B, so that the I/O monitor circuits 13A and 13B bring the interrupt processing end detection signals 24A and 24B to a low level during a period corresponding to one clock, respectively. Thus, the completion of the interrupt processing is notified to the interrupt line monitor circuits 12A and 12B, respectively, so that each of the interrupt line monitor circuits 12A and 12B judges or considers that the interrupt processing has been completed, and brings the interrupt request output inhibit signals 23A and 23B to the low level (inactive).

In the above mentioned operation, when the instruments 1A and 1B simultaneously generate the interrupt request, the driving of the local interrupt lines 22A and 22B to the low level occurs simultaneously. In order to avoid this inconvenience, it can be so modified that the interrupt line monitor circuit 12A samples the local interrupt line 22A at a rising of the clock supplied through the extended bus 3, and on the other hand, the interrupt line monitor circuit 12B samples the local interrupt line 22B at a falling of the clock supplied through the extended bus 3. With this modification, the two instruments can share the common interrupt line 2 without collision of the interrupt requests.

As seen from the above, according to the present invention, since the interrupt request generated in each of a plurality of instruments is supplied in the form of an interrupt request signal of the edge trigger type to the common interrupt line connected to the personal computer, the interrupt line sharing circuit can be applied in a personal computer system in which an interrupt request signal is defined as an edge trigger type.

Furthermore, the interrupt line sharing circuit in accordance with the present invention can supply the interrupt request signal of the edge trigger type, it can be applied only by adding a simple circuit to existing instruments.

The invention has thus been shown and described with reference to the specific embodiments. However, it should be noted that the present invention is in no way limited to the details of the illustrated structures but changes and modifications may be made within the scope of the appended claims.

What is claimed is:

1. An interrupt line sharing circuit for use in a computer system, said computer system includes a computer, a plurality of peripheral devices and one common interrupt line provided in common to said plurality of peripheral devices, said computer being configured to perform a predetermined input/output access when said computer has completed an interrupt processing, and wherein each peripheral device includes a respective interrupt line sharing circuit, each line sharing circuit comprising:

an input/output monitor which monitors whether or not said predetermined input/output access has been performed;

an interrupt line monitor connected to said input/output monitor, said interrupt line monitor monitors said common interrupt line and determines than an interrupt processing is started if an interrupt request is sent onto said common interrupt line from any one of said plurality of peripheral devices, said interrupt line monitor further determines that said interrupt processing has been completed when said input/output monitor detects said predetermined input/output access; and an interrupt line controller, coupled to said interrupt line monitor, said interrupt line controller sends said interrupt request generated in said plurality of peripheral devices, to said common interrupt line after said completion of said interrupt processing.

2. An interrupt line sharing circuit claimed as claimed in claim 1 wherein:

said predetermined input/output access is performed by outputting a predetermined address and a predetermined control signal of a predetermined logic level from said computer, and wherein said input/output monitor receives an address and said predetermined control signal outputted from said computer and activates an interrupt processing end detection signal when said address outputted from said computer is equal to said predetermined address and said predetermined control signal outputted from said computer assumes said predetermined logic level.

3. An interrupt line sharing circuit as claimed in claim 2 wherein said predetermined control signal is an input/output write signal.

4. An interrupt line sharing circuit as claimed in claim 2 wherein said input/output monitor comprises:

a comparator having a first input connected to receive said address outputted from said computer and a second input connected to receive a set value equal to a value of said predetermined address, said comparator outputting an active consistency signal when said address outputted from said computer is equal to said set value, and a logic gate receiving an output of said comparator and said predetermined control signal, said logic gate activating said interrupt processing end detection signal when said comparator outputs said active consistency signal and when said predetermined control signal assumes said predetermined logic level.

5. An interrupt line sharing circuit as claimed in claim 2 wherein:

said interrupt line monitor monitors the status of a local interrupt line connected to said common interrupt line and receives said interrupt processing end detection signal, said interrupt line monitor activates an interrupt request output inhibit signal if said interrupt request is detected on said local interrupt line when said interrupt processing end detection signal is inactive, said interrupt line control includes a memory storing an interrupt request generated in an associated peripheral device, and a gate is connected to an output of said memory and controlled by said interrupt request output inhibit signal so that said gate is closed when said interrupt request output inhibit signal is active, and wherein when said gate is opened in response to deactivation of said interrupt request output inhibit signal, said interrupt request stored in said memory is outputted through said local interrupt line to said common interrupt line.

6. An interrupt line sharing circuit as claimed in claim 5 wherein:

said interrupt line monitor includes a first D-type flipflop which samples the status of said local interrupt line in response to a clock outputted from said computer, and a first set/reset flipflop having a reset input connected to an output of said first D-type flipflop, a set input connected to receive said interrupt processing end detection signal, and an output for outputting said interrupt request output inhibit signal;

said memory of said interrupt line control includes a second D-type flipflop which latches a fixed value in response to said interrupt request generated in an associated peripheral device;

said gate of said interrupt line control includes a logic gate which receives an output of said second D-type flipflop and receives said interrupt request output inhibit signal, said logic gate outputting, as an active intermediate interrupt request signal, said output of said second D-type flipflop when said interrupt request output inhibit signal is inactive;

said interrupt line control further includes a third D-type flipflop for latching said active intermediate interrupt request signal in response to said clock outputted from said computer, and a tristate buffer having an input connected to a fixed level and a control input connected to an output of said third D-type flipflop, so that when said output of said third D-type flipflop is activated, said tristate buffer outputs said interrupt request signal through said local interrupt line to said common interrupt line, said output of said third D-type flipflop being also connected to a preset input of said second D-type flipflop so that when said output of said third D-type flipflop is activated, said second D-type flipflop is preset.

7. A computer system comprising:

a plurality of peripheral devices, a computer including an extended bus; and a common interrupt line provided in common to said plurality of peripheral devices;

said computer being configured to perform a predetermined input/output access when said computer has completed an interrupt processing;

each of said plurality of peripheral devices has an interrupt line sharing circuit, said interrupt line sharing circuits each include:
- a local interrupt line connected in common to said common interrupt line;
- an input/output monitor connected to said extended bus, said input/output monitor monitors whether or not said predetermined input/output access has been performed through said extended bus;
- an interrupt line monitor connected to said local interrupt line, said interrupt line monitor monitors said common interrupt line, and determines that an interrupt processing is started if an interrupt request is sent onto said common interrupt line from any one of said plurality of peripheral devices, said interrupt line monitor further is connected to said input/output monitor, and determines that said interrupt processing has been completed when said input/output monitor detects said predetermined input/output access; and
- an interrupt line control connected to receive an interrupt request generated in a corresponding peripheral device, and coupled to said interrupt line monitor, said interrupt line control sends said interrupt request generated in said corresponding peripheral device, to said local interrupt line after said completion of said interrupt processing.

8. An interrupt line sharing circuit as claimed in claim 7 wherein:
said predetermined input/output access is performed by outputting a predetermined address and a predetermined control signal of a predetermined logic level to said extended bus from said computer, and
wherein said input/output monitor is coupled to said extended bus and receives an address and said predetermined control signal outputted from said computer, said input/output monitor activates an interrupt processing end detection signal when said address outputted from said computer is equal to said predetermined address and said predetermined control signal outputted from said computer assumes said predetermined logic level.

9. An interrupt line sharing circuit as claimed in claim 8 wherein said predetermined control signal is an input/output write signal.

10. An interrupt line sharing circuit as claimed in claim 8 wherein said input/output monitor includes:
- a comparator having a first input connected to said extended bus to receive said address outputted from said computer and a second input connected to receive a set value equal to a value of said predetermined address, said comparator outputs an active consistency signal when said address outputted from said computer is equal to said set value, and
- a logic gate having a first input receiving an output of said comparator and a second input connected to said extended bus to receive said predetermined control signal, said logic gate activating said interrupt processing end detection signal when said comparator outputs said active consistency signal and when said predetermined control signal assumes said predetermined logic level.

11. An interrupt line sharing circuit as claimed in claim 8 wherein:
said interrupt line monitor is connected to said local interrupt line and monitors the status of said common interrupt line, said interrupt line monitor is further connected to receive said interrupt processing end detection signal, and activates an interrupt request output inhibit signal if said interrupt request is detected on said common interrupt line when said interrupt processing end detection signal is inactive, and
wherein said interrupt line control includes a memory storing an interrupt request generated in said corresponding peripheral device, and a gate connected to an output of said memory and controlled by said interrupt request output inhibit signal so that said gate is closed when said interrupt request output inhibit signal is active, and wherein when said gate is opened in response to deactivation of said interrupt request output inhibit signal, said interrupt request stored in said memory is outputted through said local interrupt line to said common interrupt line.

12. An interrupt line sharing circuit as claimed in claim 11 wherein:
said interrupt line monitor includes a first D-type flipflop which samples the status of said local interrupt line in response to a clock outputted from said computer, and a first set/reset flipflop having a reset input connected to an output of said first D-type flipflop, a set input connected to receive said interrupt processing end detection signal, and an output for outputting said interrupt request output inhibit signal;
said memory of said interrupt line control includes a second D-type flipflop which latches a fixed value in response to said interrupt request generated in an associated peripheral device;
said gate of said interrupt line control includes a logic gate which receives an output of said second D-type flipflop and receives said interrupt request output inhibit signal, said logic gate outputting, as an active intermediate interrupt request signal, said output of said second D-type flipflop when said interrupt request output inhibit signal is inactive, said gate further including a third D-type flipflop which latches said active intermediate interrupt request signal in response to said clock outputted from said personal computer, and
said interrupt line control further including a tristate buffer having an input connected to a fixed level and a control input connected to an output of said third D-type flipflop, so that when said output of said third D-type flipflop is activated, said tristate buffer outputs said interrupt request signal through said local interrupt line to said common interrupt line, said output of said third D-type flipflop being also connected to a preset input of said second D-type flipflop so that when said output of said third D-type flipflop is activated, said second D-type flipflop is preset.

13. A method for sharing one common interrupt line provided in common to a plurality of peripheral devices in a computer system, said method comprising the acts of:
causing a computer to perform a predetermined input/output access when said computer has completed an interrupt processing;
determining that an interrupt processing is started if an interrupt request is sent onto said common interrupt line from any one of said plurality of peripheral devices;
determining that said interrupt processing has been completed when said predetermined input/output access is detected; and
determining a busy/not-busy state of said common interrupt line on the basis of said determining that an interrupt processing is started and on the basis of said determining that said interrupt processing has been completed; and sending an interrupt request generated in one of said plurality of peripheral devices to said common interrupt line after said determining that said interrupt processing is completed.

14. A method as claimed in claim 13 wherein:

said predetermined input/output access is performed by outputting a predetermined address and a predetermined control signal of a predetermined logic level from said computer, and wherein said determining of the completion of said interrupt processing is performed by comparing an address outputted from said computer with a predetermined address value and monitoring whether or not said predetermined control signal outputted from said computer is at said predetermined logic level, so that it is determined that said interrupt processing has been completed when said address outputted from said personal computer is equal with said predetermined address and said predetermined control signal outputted from said personal computer is at said predetermined logic level.

15. A method as claimed in claim 14 wherein said predetermined control signal is an input/output write signal.

16. A peripheral device coupled to a host through a common interrupt line, said peripheral device comprising:

a first monitor which monitors signals generated by said host;

a second monitor which monitors said common interrupt line to determine whether an interrupt processing has begun, and said second monitor further analyzes said signals from said host, received by said first monitor, to determine if said interrupt processing has completed; and a controller which allows access to said common interrupt line when said second monitor determines that an interrupt processing has not begun and when said second monitor determines that any existing interrupt processing has completed.

17. The peripheral device claimed in claim 16 wherein said first monitor comprises:

a comparator having a first input connected to receive said signals outputted from said host and a second input connected to receive a set value; said second monitor outputting an active consistency signal when said signal outputted from said host is equal to said set value, and a logic gate receiving an output of said comparator and said signals, said logic gate activating an interrupt processing end detection signal when said consistency signal is active and said signals assume a predetermined logic level.

18. The peripheral device claimed in claim 16 wherein said second monitor monitors the status of a local interrupt line connected between said peripheral device and said common interrupt line and receives an interrupt processing end detection signal generated by said first monitor when said host sends signals indicative of said host communicating with a peripheral device;

said second monitor further activates an interrupt request output inhibit signal when an interrupt request is detected on said local interrupt line when said interrupt processing end detection signal is inactive;

said interrupt line control includes a memory storing an interrupt request generated in said peripheral device;

a gate is connected to an output of said memory and controlled by said interrupt request output inhibit signal so that said gate is closed when said interrupt request output inhibit signal is active, and wherein when said gate is opened in response to deactivation of said interrupt request output inhibit signal, said interrupt request stored in said memory is outputted through said local interrupt line to said common interrupt line.

19. The peripheral device claimed in claim 18 wherein said second monitor includes a first D-type flipflop sampling the status of said local interrupt line in response to a clock outputted from said host, and a first set/reset flipflop having a reset input connected to an output of said first D-type flipflop, a set input connected to receive said interrupt processing end detection signal, and an output for outputting said interrupt request output inhibit signal;

said memory of said control includes a second D-type flipflop for latching a fixed value in response to said interrupt request generated in said peripheral device;

said gate of said control includes a logic gate receiving an output of said second D-type flipflop and receives said interrupt request output inhibit signal, said logic gate outputting, as an active intermediate interrupt request signal, said output of said second D-type flipflop when said interrupt request output inhibit signal is inactive, said control further includes a third D-type flipflop for latching said active intermediate interrupt request signal in response to said clock outputted from said host, and a tristate buffer having an input connected to a fixed level and a control input connected to an output of said third D-type flipflop, so that when said output of said third D-type flipflop is activated, said tristate buffer outputs said interrupt request signal through said local interrupt line to said common interrupt line, said output of said third D-type flipflop being also connected to a preset input of said second D-type flipflop so that when said output of said third D-type flipflop is activated, said second D-type flipflop is preset.

20. The peripheral device claimed in claim 18 wherein said first monitor comprises:

a comparator having a first input connected to receive said signals outputted from said host and a second input connected to receive a set value; said second monitor outputting an active consistency signal when said signal outputted from said host is equal to said set value, and a logic gate receiving an output of said comparator and said signals, said logic gate activating an interrupt processing end detection signal when said consistency signal is active and said signals assume a predetermined logic level.

21. The method as claimed in claim 13, wherein said act of sending is performed only when said common interrupt line is in said not-busy state.

* * * * *